US007060648B2

(12) United States Patent
Christian et al.

(10) Patent No.: US 7,060,648 B2
(45) Date of Patent: Jun. 13, 2006

(54) TUNGSTEN-CONTAINING FUEL CELL CATALYST AND METHOD OF MAKING SAME

(75) Inventors: Joel B. Christian, Towanda, PA (US); Robert G. Mendenhall, Waverly, NY (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 10/631,302

(22) Filed: Jul. 31, 2003

(65) Prior Publication Data

US 2004/0023795 A1    Feb. 5, 2004

Related U.S. Application Data

(63) Continuation of application No. 09/965,444, filed on Sep. 27, 2001, now Pat. No. 6,656,870.

(60) Provisional application No. 60/236,503, filed on Sep. 29, 2000.

(51) Int. Cl.
*B01J 21/18*     (2006.01)
*B01J 23/00*     (2006.01)
*H01M 4/90*      (2006.01)
*H01M 4/96*      (2006.01)
*H01M 4/86*      (2006.01)

(52) U.S. Cl. .................. 502/180; 502/182; 429/40; 429/44

(58) Field of Classification Search ................. 502/180, 502/182; 429/40, 44
See application file for complete search history.

(56) References Cited

U.S. PATENT DOCUMENTS

| 3,615,840 | A | * | 10/1971 | Wolfe, Jr. ................. 429/44 |
| 3,784,412 | A | * | 1/1974 | Mund et al. ................. 502/101 |
| 3,902,917 | A | * | 9/1975 | Baresel et al. ............... 423/440 |
| 4,481,303 | A | * | 11/1984 | McIntyre et al. ............ 502/159 |
| 5,298,343 | A | * | 3/1994 | Savadogo et al. ............ 429/44 |
| 5,922,488 | A | * | 7/1999 | Marucchi-Soos et al. ..... 429/44 |
| 6,183,894 | B1 | * | 2/2001 | Adzic et al. ................. 429/13 |
| 6,551,569 | B1 | * | 4/2003 | Christian et al. ............ 423/440 |
| 6,656,870 | B1 | * | 12/2003 | Christian et al. ............ 502/180 |
| 6,696,184 | B1 | * | 2/2004 | Christian et al. ........... 428/698 |
| 2003/0059666 | A1 | * | 3/2003 | Kourtakis .................... 429/40 |

* cited by examiner

*Primary Examiner*—J. A. Lorengo
*Assistant Examiner*—Patricia L. Hailey
(74) *Attorney, Agent, or Firm*—Robert F. Clark

(57) ABSTRACT

A tungsten-containing fuel cell catalyst having high electrochemical activity and its method of making are described. The tungsten-containing catalyst may be formed in situ in a fuel cell after the fuel cell is assembled. The catalyst is formed by a low temperature electrochemical activation of a tungsten-containing precursor which has been deposited on a carbon support

15 Claims, 3 Drawing Sheets

TUNGSTEN-CONTAINING FUEL CELL CATALYST AND METHOD OF MAKING SAME

CROSS REFERENCES TO RELATED APPLICATIONS

This application is a continuation of application Ser. No. 09/965,444, filed Sep. 27, 2001 now U.S. Pat. No. 6,656,870. This application claims the benefit of U.S. Provisional Application No. 60/236,503, filed Sep. 29, 2000. This application is related to commonly-owned applications Ser. No. 09/675,771, filed Sep. 29, 2000 and Ser. No. 09/675,510, filed Sep. 29, 2000, both of which are incorporated herein by reference.

TECHNICAL FIELD

This invention is related to catalysts for fuel cells. More particularly, this invention is related to tungsten-containing compounds which are useable as fuel cell catalysts.

BACKGROUND ART

Fuel cells produce electricity by converting reactants such as hydrogen, hydrocarbons, and oxygen into products such as water and carbon dioxide. In general, a typical low-temperature fuel cell comprises an anode and cathode separated by an electrolyte. The anode and cathode consist of a conductive support having a thin layer of a catalyst uniformly dispersed over the surface of the support. During operation, a continuous flow of fuel is fed to the anode while, simultaneously, a continuous flow of oxidant is supplied to the cathode.

In a conventional low temperature $H_2/O_2$ fuel cell, a hydrogen gas fuel is oxidized with the aid of a platinum catalyst at the anode to generate electrons and protons which travel by separate paths to the cathode. The electrons are conducted through an external circuit and the protons are conducted through the electrolyte. At the cathode, oxygen gas combines with the electrons and protons to produce water, again with the aid of a platinum catalyst. The current generated by the electrons flowing through the external circuit can be used for work.

A fuel cell configuration of particular importance is the proton-exchange membrane (PEM) fuel cell. In a typical PEM fuel cell, the electrolyte is a solid polymeric material capable of conducting protons, e.g., a perfluorosulfonic acid polymer (e.g., Nafion® by DuPont). The proton-conducting polymer membrane is sandwiched between membrane electrode assemblies (MEA) formed from platinum catalysts dispersed on carbon black. Examples of these devices are described in U.S. Pat. Nos. 6,030,718, 6,040,007 and 5,945,231 which are incorporated herein by reference.

Platinum catalysts are preferred for fuel cells because of their high electrochemical activity. However, platinum is expensive and easily poisoned by the trace amounts of carbon monoxide typically found in hydrogen fuels. Numerous attempts have been made to find less expensive electrocatalysts or reduce the sensitivity of platinum catalysts to carbon monoxide. Several of these attempts have focused on tungsten and molybdenum compounds, and in particular their carbides and oxides. For example, U.S. Pat. No. 5,922,488 describes a CO-tolerant anode catalyst which uses a carbon-supported, platinum-dispersed, non-stoichiometric hydrogen tungsten bronze having the formula $Pt—H_xWO_3$ wherein x ranges from about 0.05 to about 0.36. U.S. Pat. No. 5,298,343 describes a polycomponent electrocatalyst comprised preferably of platinum or palladium and a chemical component selected from the group consisting of tungstic acid, molybdic acid, ammonium tungstate, ammonium molybdate, sodium tungstate and sodium molybdate. U.S. Pat. No. 5,945,231 contemplates combining tungsten carbide with ruthenium oxide or ruthenium to form a catalysts for a direct liquid-feed fuel cell. Unfortunately, these tungsten and molybdenum-based catalysts have not been shown to exhibit an acceptable level of electrochemical activity for practical fuel cell application without the additional presence of an expensive co-catalyst. Therefore, it would be an advantage to have a tungsten-containing fuel cell catalyst which exhibits a high electrochemical activity without an expensive co-catalyst.

SUMMARY OF THE INVENTION

It is an object of the invention to obviate the disadvantages of the prior art.

It is another object of the invention to provide a tungsten-containing fuel cell catalyst which has an electrochemical activity which approaches that of platinum.

It is yet another object of the invention to provide a method of making a tungsten-containing fuel cell catalyst in situ in a fuel cell.

It is still another object of the invention to provide a method for regenerating a tungsten-containing fuel cell catalyst in situ in a fuel cell.

In accordance with one object the invention, there is provided a tungsten-containing fuel cell catalyst comprising a carbon support having a surface layer containing tungsten, the tungsten-containing catalyst generating a power output which is greater than about 20 percent of a power output of an equivalently prepared platinum catalyst when operating under the same conditions using an electrochemical oxidation of hydrogen.

In accordance with another object of the invention, there is provided a method of making a tungsten-containing fuel cell catalyst comprising the steps of:
(a) depositing a tungsten-containing precursor on a carbon support;
(b) contacting the support with a solution of an electrolyte;
(c) applying a voltage to the support sufficient to form the tungsten-containing catalyst.

In accordance with yet another object of the invention, there is provided a method of regenerating a tungsten-containing fuel cell catalyst comprising the steps of:
a) contacting the catalyst with a fluid-based carbon source;
b) applying a voltage to the catalyst sufficient to substantially regenerate the catalyst.

DESCRIPTION OF PREFERRED EMBODIMENTS

Figure 1:
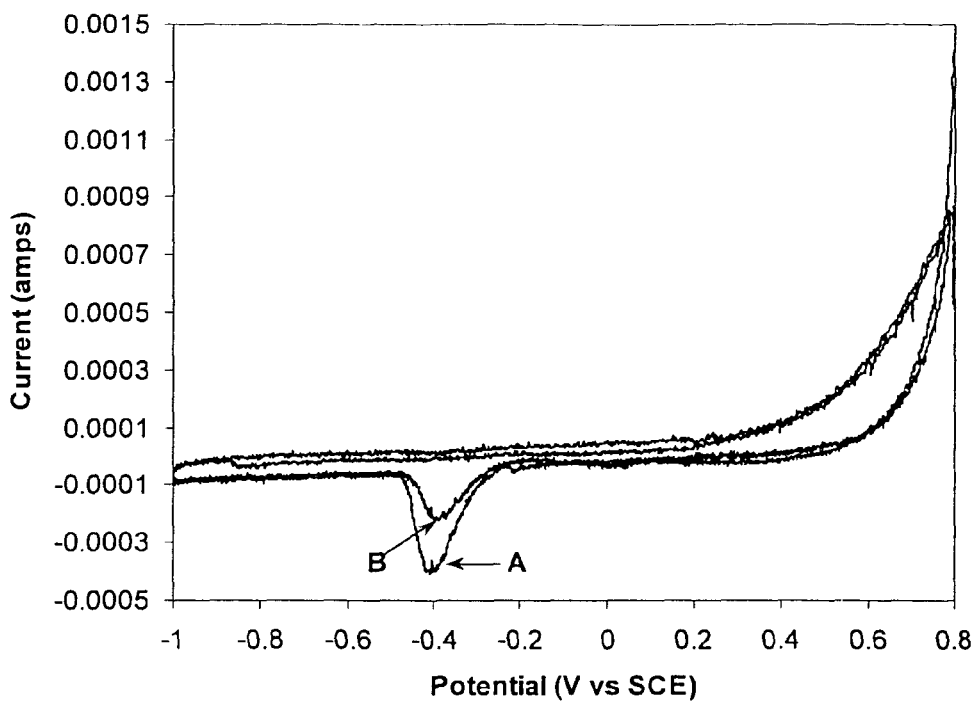
FIG. 1 is a cyclic voltammetry analysis demonstrating the activation of the tungsten-containing fuel cell catalyst of this invention.

For a better understanding of the present invention, together with other and further objects, advantages and capabilities thereof, reference is made to the following disclosure and appended claims taken in conjunction with the above-described drawings.

A tungsten-containing fuel cell catalyst having high electrochemical activity has been invented which may be formed in situ in a fuel cell after the fuel cell is assembled. The catalyst is formed by a low temperature (less than about 100° C.) electrochemical activation of a tungsten-containing precursor which has been deposited on a carbon support, e.g., graphite, activated carbon or carbon black. The formation of the tungsten-containing catalyst layer on the carbon support has been confirmed by sputtered neutral mass spectrometry (SNMS) and x-ray photoelectron spectroscopy (XPS, also known as ESCA).

In a preferred method, carbon black is mixed with an aqueous solution of the precursor, agitated mechanically and ultrasonically to produce a uniform dispersion and then dried. The dried supported catalyst precursor is formed into a conventional PEM cell membrane-electrode assembly (MEA) which forms the anode of the PEM cell. The cathode of the PEM cell is an MEA made with a platinum catalyst. Once the PEM cell is constructed, an electrolyte solution is added. Preferably the electrolyte solution contains a fluid-based carbon source, e.g., an alcohol, an aqueous carbonate, an organic acid solution, or bubbled CO or $CO_2$ gas. A preferred electrolyte solution is 2M $Na_2CO_3$. A voltage is applied to activate the precursor to form the tungsten-containing catalyst. Preferably, the applied voltage is from about 0.5 volt to about 30 volts DC. In general, the voltage need only be applied until the current demand substantially decreases, normally within one minute. However, it is preferred to apply the voltage for about 30 minutes to insure activation of the catalyst. The PEM cell anode is connected to the negative DC source and the PEM cell cathode is connected to the positive DC source. Thus, the electrochemical roles of the anode and cathode are reversed with respect to normal PEM cell operation.

Preferably, the tungsten-containing precursor yields a tungstate anion, $WO_4^{-2}$, in an aqueous solution. Such preferred tungsten-containing precursors include ammonium tungstate, sodium tungstate, or tungstic acid. More preferably, the tungsten-containing precursor is a tungsten heteropoly salt such as ammonium metatungstate (AMT). The loading of the catalyst precursor onto the carbon support may be increased by using a cationic surfactant such as cetylpyridinium chloride. In a preferred method, carbon black is contacted with a solution of the cationic surfactant, mixed, dried, and milled prior to being dispersed in an aqueous solution of the tungsten-containing precursor. The use of the surfactant can increase the tungsten loading by a factor of two from a typical loading of about 20 weight percent (wt. %) tungsten to about 40 wt. % tungsten.

The tungsten-containing catalyst of this invention can generate a power output which is greater than about 20 percent of the power output of an equivalently prepared platinum catalyst when operating under the same conditions using an electrochemical oxidation of hydrogen. Preferably, the power output of the tungsten-containing catalyst is greater than about 40 percent of the power output of the platinum catalyst. Even more preferred, the power output of the tungsten-containing catalyst is greater than about 80 percent of the power output of the platinum catalyst. Most preferably, the power output of the tungsten-containing catalyst is about 100 percent of the power output of the platinum catalyst.

The following non-limiting examples are presented.

EXAMPLE 1

The activation of the tungsten-containing catalyst was observed using cyclic voltammetry. A glassy carbon rotating disk electrode was prepared by bonding the AMT catalyst precursor to the glassy carbon. A 0.2 g amount of the catalyst was mixed with 100 ml of ultrapure water and 1 ml of a 5% liquid Nafion® solution and then applied to the electrode. The electrode was rotated at 1500 rpm under an argon gas shield in aqueous 2M $Na_2CO_3$. Using a platinum flag as the counter-electrode, the potential referenced to a standard calomel electrode (SCE) was swept from 800 mV vs. SCE to –1000 mV vs. SCE for two complete cycles. The cyclic voltammetry curves are shown in FIG. 1. The curves show a reactive region at –400 mV vs. SCE. The second sweep B suggests that an irreversible reaction had occurred during the initial sweep A.

EXAMPLE 2

The electrochemical activity of the tungsten-containing catalyst was investigated by forming the catalyst on carbon rods. The tungsten-containing catalyst rods were prepared by soaking 0.242 in, diameter×12 in. long carbon rods (Bay Carbon Inc., Type AGKSP) in an aqueous solution of ammonium metatungstate (AMT), $(NH_4)_6H_2W_{12}O_{40} \cdot 2H_2O$, (OSRAM SYLVANIA Inc.) containing 320 g of AMT per 200 ml of water. After soaking the rods for 48 hours, the catalyst was activated in 2M $Na_2CO_3$ at 4 VDC for 30 minutes.

A similarly loaded platinum-catalyst carbon rod was prepared by soaking the rod in an aqueous solution of 6 g of chloroplatinic acid ($H_2PtCl_6$) in 6 ml of water for 48 hours. The rod was then fired in hydrogen to reduce the platinum.

Figure 2:
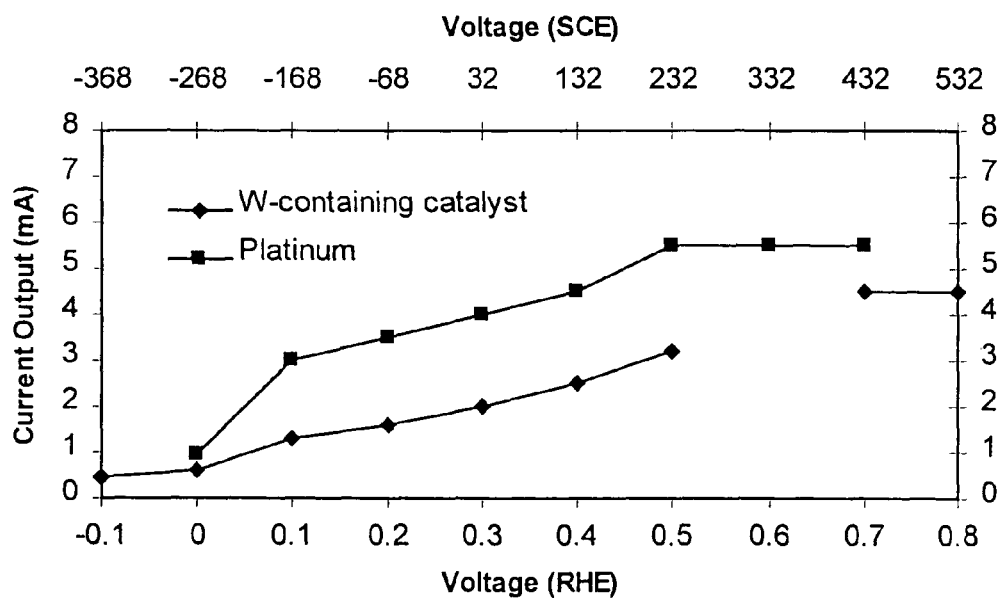
FIG. 2 is a controlled-potential voltammetry analysis demonstrating the electrochemical activity of the tungsten-containing fuel cell catalyst of this invention compared to platinum.

A series of controlled-potential voltammetry experiments were carried out in 0.5M $H_2SO_4$ with bubbling hydrogen using a Pine AFCBP1 Analog Bipotentiostat. For each test the rod was placed at the surface of the electrolyte and raised to form a slight meniscus on the end of the rod. A voltage was applied using a platinum wire counter-electrode and referenced to a standard calomel electrode. The resulting current output was allowed to reach a steady state. The results are shown in FIG. 2 and demonstrate that the electrochemical activity of the tungsten-containing catalyst can approach the activity of platinum.

EXAMPLE 2A

Tungsten-containing catalyst rods were prepared by soaking 0.242 in. diameter×12 in. long carbon rods (Bay Carbon Inc., Type AGKSP) in an aqueous solution of ammonium metatungstate (AMT), $(NH_4)_6H_2W_{12}O_{40} \cdot 2H_2O$, (OSRAM SYLVANIA Inc.) containing 320 g of AMT per 200 ml of water. After soaking the rods for 48 hours, the soaked rods were fired in air at 700° C. for an hour to fully oxidize the tungsten-containing precursor to a yellow $WO_3$. The catalyst was then activated in 2M $Na_2CO_3$ at 4 VDC for 20 minutes.

A series of controlled-potential voltammetry experiments were carried out in 0.5M $H_2SO_4$ with bubbling hydrogen using a Pine AFCBP1 Analog Bipotentiostat. For each test the rod was placed at the surface of the electrolyte and raised to form a slight meniscus on the end of the rod. A voltage was applied using a platinum wire counter-electrode and referenced to a standard calomel electrode. The resulting current output was allowed to reach a steady state. The results are similar to those shown in FIG. 2 and further demonstrate that the electrochemical activity of the tungsten-containing catalyst can approach the activity of platinum.

EXAMPLE 3

A series of experiments were conducted to determine the loading capacity of a carbon black support. Samples of a tungsten-containing catalyst precursor supported on carbon black were made using the following procedure. A 50 g amount of a carbon black (Vulcan-72R from Cabot Corp.) was contacted with 0.5 liters of a 0.15 M solution of cetylpyridinium chloride, a cationic surfactant (1-hexadecylpyridinium chloride, Sigma Aldrich) The carbon black dispersion was mixed on a paint shaker for 20 minutes, dried at 110° C., and ball milled for one-half hour. A 50 g amount of the dried, milled carbon black was contacted with 0.4 liters of deionized water containing 60 g of ammonium metatungstate. After mixing on a paint shaker for 30 minutes, the dispersion was allowed to set for about 16 hours. The carbon black dispersion was then dried at 110° C. for 24 hours and ball milled for 0.5 hours to yield the finished catalyst precursor. Additional catalyst precursors were made using a similar procedure but without pretreating the carbon black with the cationic surfactant. The catalyst precursors were then analyzed by ESCA to determine the surface loadings. The results of the ESCA analyses are given in Table 1 below. The analysis of the carbon support surface shows that the pretreatment of the carbon black with the cationic surfactant increased the tungsten loading by about a factor of two from about 20 wt. % W to about 40 wt. % W.

| Sample | Cationic Surfactant | Tungsten Loading (wt. %) |
| --- | --- | --- |
| 1 | yes | 38 |
| 2 | no | 19 |

EXAMPLE 4—PEM Fuel Cell

A PEM fuel cell was constructed and operated using an anode made with the tungsten-containing catalyst of this invention. The catalyst precursor for fuel cell anode was prepared by the following method.

a) dissolving 828 grams of ammonium metatungstate (AMT), $(NH_4)_6H_2W_{12}O_{40} \cdot 2H_2O$, (OSRAM SYLVANIA Inc.) in 18 liters of deionized water;

b) adding the AMT solution to 1.0 kilogram of carbon black (Vulcan XC-72R from Cabot Corp.);

c) agitating for 1.5 hours;

d) evaporating the water from the mixture and drying the carbon/AMT mixture at 110° C.; and f) ball milling the dried material for 0.5 hours to form the finished catalyst precursor.

The surface of the catalyst precursor was analyzed by x-ray photoelectron spectroscopy (XPS) from which a loading of about 20% by weight tungsten on carbon was determined.

A membrane electrode assembly (MEA) was prepared using a conventional 5-layer fluorocarbon bonding method. The MEA was fabricated at an area of 5 $cm^2$. The MEA was assembled using Toray paper, TFE binder, and a loading of 0.5 mg of active catalyst per square centimeter.

A 5 $cm^2$ PEM cell (ElectroChem model FC05-01SP) was assembled using the MEA containing the catalyst precursor as the anode. The cathode consisted of an MEA containing a platinum catalyst. The cathode catalyst was 20% by weight Pt on carbon. The catalyst precursor was activated by filling both anode and cathode chambers with an aqueous solution of 2M $Na_2CO_3$ and applying 4 VDC for 35 minutes using Keithly Model 2420 Sourcemeter, running in voltage-priority mode. Gas bubbles were allowed to escape from the cell by maintaining a variable liquid flow through the cell. Following activation each chamber was flushed with 3 liters of deionized water and blown dry with the respective working gas, hydrogen for the anode side and air for the cathode side.

Working gas connections were made using humidified compressed air on the cathode and humidified cryogenic grade hydrogen on the anode side. Both cell exhausts were hooked to separate exhaust flowmeters set at 7 $cm^3$/min. The PEM cell was connected to a datalogging computer equipped with 64 channels of voltage logging capability. A second 5 $cm^2$ PEM fuel cell with supported platinum catalysts for both the anode and cathode was operated concurrently with the test cell as a control. Various loads were applied simultaneously to each cell using precision power resistors (Vishay-Dale Type RH-50). The cell voltage was recorded as an indirect measure of the current output, and the power in watts calculated from the current and voltage values.

Figure 3:
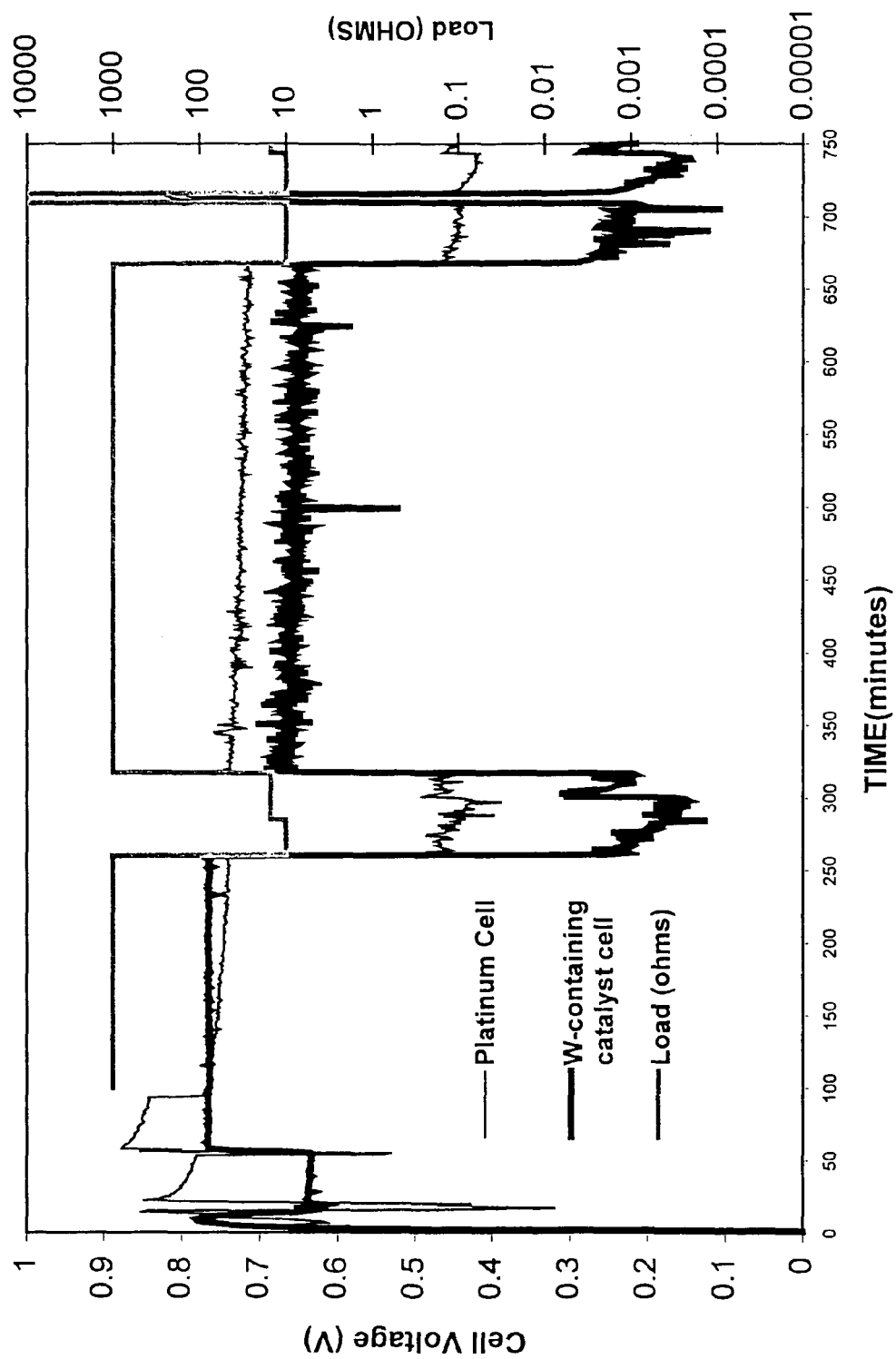
FIG. 3 illustrates the time/voltage/load characteristics of an $H_2$:air PEM fuel cell having a platinum catalyst cathode and an anode made with the tungsten-containing fuel cell catalyst of this invention compared to a similarly operated fuel cell having both a platinum-catalyst anode and cathode.
Figure 4:
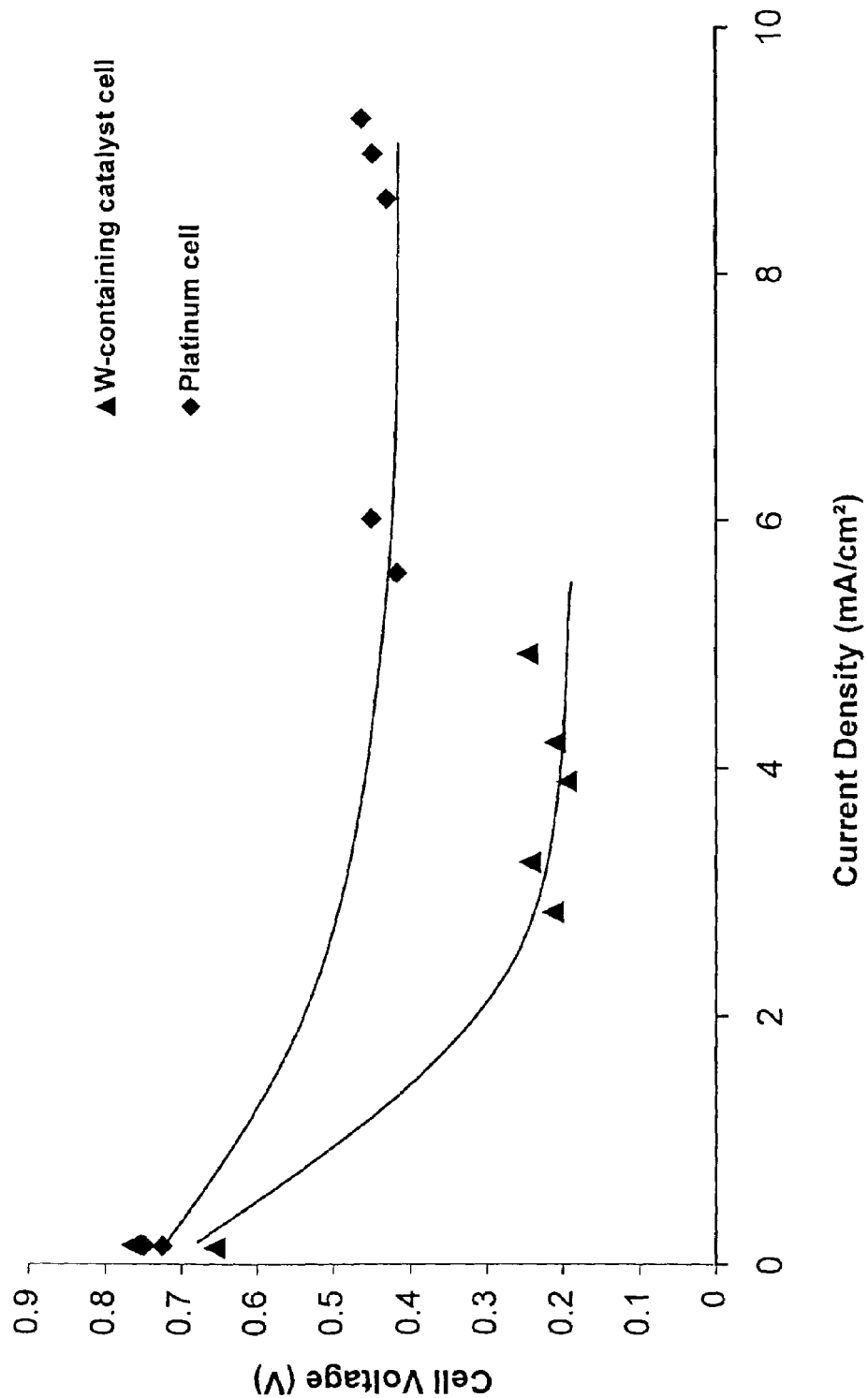
FIG. 4 illustrates the power output of an $H_2$:air PEM fuel cell having a platinum catalyst cathode and anode made with the tungsten-containing fuel cell catalyst of this invention compared to a similarly operated fuel cell having both a platinum-catalyst anode and cathode.

Each PEM cell was tested at room temperature and under low pressure (<1 psig) operation. Working gases were humidified by bubbling through room-temperature water The test data for both PEM cells is shown in FIG. 3. The steady-state voltage under a 1000 ohm load after 150 minutes of operation for the PEM cell using the tungsten-containing catalyst was about 0.75 V and approximately equal to the voltage of the control cell. After 350 minutes, the test cell voltage decreased to about 0.65 V compared to about 0.75 V for the control cell. The power output curves for these fuel cell are shown in FIG. 4. The test cell exhibited a relatively constant potential of about 0.25 volts at current densities of between about 2 to about 6 mA/$cm^2$ at a temperature of about 25° C. and a pressure of about 1 atmosphere.

The effect of electrochemical activation of the tungsten-containing catalyst was demonstrated by operating a similarly constructed fuel cell without first activating the tungsten-containing catalyst. Only a negligible amount of power was achieved, <0.5 mA/$cm^2$, which may be speculated to indicate minor electrochemical activity of the precursor.

Because the catalyst may be formed in situ in the fuel cell, it is believed that the catalysts could be reactivated on a periodic basis to reverse aging due to oxidation and contamination. Additionally, lost catalyst might be replenished, for example, by adding dilute tungstate solutions to provide the catalyst precursor in situ without requiring disassembly. The catalyst precursor could then be activated using the above method.

EXAMPLE 5

The PEM fuel cell of Example 4 was operated to failure by allowing air to oxidize the anode side electrocatalyst. The spent catalyst was activated by filling both anode and cathode chambers with an aqueous solution of 2M $Na_2CO_3$ and applying 4 VDC for 30 minutes using Keithly Model 2420 Sourcemeter, running in voltage-priority mode. Gas bubbles were allowed to escape from the cell by maintaining a variable liquid flow through the cell. Following activation each chamber was flushed with 3 liters of deionized water and blown dry with the respective working gas, hydrogen for the anode side and air for the cathode side. PEM Cell operation was resumed at power outputs consistent with the initial activation.

While there has been shown and described what are at the present considered the preferred embodiments of the invention, it will be obvious to those skilled in the art that various changes and modifications may be made therein without departing from the scope of the invention as defined by the appended claims.

We claim:

1. A tungsten-containing fuel cell catalyst consisting of an electrochemically activated tungstate catalyst supported on a carbon support, the tungsten-containing catalyst generating a power output which is greater than about 20 percent of a power output of an equivalently prepared platinum catalyst when operating under the same conditions using an electrochemical oxidation of hydrogen.

2. The tungsten-containing catalyst of claim 1 wherein the power output of the tungsten-containing catalyst is greater than about 40% of the power output of the platinum catalyst.

3. The tungsten-containing catalyst of claim 1 wherein the power output of the tungsten-containing catalyst is greater than about 80% of the power output of the platinum catalyst.

4. The tungsten-containing catalyst of claim 1 wherein the power output of the tungsten-containing catalyst is about 100% of the power output of the platinum catalyst.

5. The tungsten-containing catalyst of claim 1 wherein the tungsten-containing catalyst has a tungsten loading of about 20 weight percent tungsten.

6. The tungsten-containing catalyst of claim 1 wherein the tungsten-containing catalyst has a tungsten loading of about 40 weight percent tungsten.

7. The tungsten-containing catalyst of claim 1 wherein the tungstate is ammonium metatungstate, sodium tungstate, or tungstic acid.

8. The tungsten-containing catalyst of claim 1 wherein the tungstate is ammonium metatungstate.

9. A tungsten-containing fuel cell catalyst consisting of an electrochemically activated tungstate catalyst supported on a carbon support, the tungsten-containing catalyst in a hydrogen:air PEM fuel cell having a single 5 $cm^2$ cell producing a cell voltage of about 0.75 volts at a 1000 ohm load.

10. The tungsten-containing catalyst of claim 9 wherein the tungstate is ammonium metatungstate, sodium tungstate, or tungstic acid.

11. The tungsten-containing catalyst of claim 9 wherein the tungstate is ammonium metatungstate.

12. A tungsten-containing fuel cell catalyst consisting of an electrochemically activated tungstate supported on a carbon support, the tungsten-containing catalyst producing a potential of about 0.25 volts at current densities of between about 2 to about 6 $mA/cm^2$ at a temperature of about 25° C. and a pressure of about 1 atmosphere.

13. The tungsten-containing catalyst of claim 12 wherein the potential is measured in a hydrogen:air fuel cell having an anode made with the tungsten-containing catalyst and a cathode made with a platinum catalyst.

14. The tungsten-containing catalyst of claim 12 wherein the tungstate is ammonium metatungstate, sodium tungstate, or tungstic acid.

15. The tungsten-containing catalyst of claim 12 wherein the tungstate is ammonium metatungstate.

* * * * *